United States Patent
Bowman et al.

(10) Patent No.: US 8,121,872 B2
(45) Date of Patent: Feb. 21, 2012

(54) SYSTEM AND METHOD FOR ALLOCATING SEATS FOR A TICKETED EVENT

(75) Inventors: Robert A. Bowman, Westport, CT (US); Heather L. Benz, Kinnelon, NJ (US); Mark Plutzer, Great Neck, NY (US)

(73) Assignee: MLB Advanced Media, L.P., New York, NY (US)

( * ) Notice: Subject to any disclaimer, the term of this patent is extended or adjusted under 35 U.S.C. 154(b) by 2360 days.

(21) Appl. No.: 10/998,834

(22) Filed: Nov. 29, 2004

(65) Prior Publication Data

US 2006/0116916 A1    Jun. 1, 2006

(51) Int. Cl.
*G06Q 10/00* (2006.01)
(52) U.S. Cl. .......................................... 705/5
(58) Field of Classification Search ........................ None
See application file for complete search history.

(56) References Cited

U.S. PATENT DOCUMENTS

| | | | |
|---|---|---|---|
| 2,542,890 A | | 2/1951 | Basu et al. |
| 5,239,480 A | * | 8/1993 | Huegel ............................. 705/5 |
| 5,255,184 A | | 10/1993 | Hornick et al. |
| 5,270,921 A | | 12/1993 | Hornick |
| 2002/0023041 A1 | * | 2/2002 | Brett ............................... 705/37 |
| 2002/0103681 A1 | | 8/2002 | Tolis et al. |
| 2003/0069764 A1 | | 4/2003 | Gathman et al. |
| 2004/0181438 A1 | | 9/2004 | Hoene et al. |
| 2004/0205006 A1 | * | 10/2004 | Kanai ............................. 705/26 |

* cited by examiner

*Primary Examiner* — Shannon Campbell
(74) *Attorney, Agent, or Firm* — Foley & Lardner LLP

(57) ABSTRACT

A system and method relates to allocating seats to a ticketed event. The method can include receiving a request for a number of seats at a ticketed event, selecting a first seat wherein the first seat is determined to be a best unassigned seat at the ticketed event, and determining a best grouping of seats wherein the best grouping of seats includes the number of seats requested and further wherein the best grouping of seats comprises the best unassigned seat at the ticketed event.

22 Claims, 3 Drawing Sheets

|   | 1 | 2 | 3 | 4 | 5 | 6 | 7 | 8 | 9 | 10 | 11 | 12 |
|---|---|---|---|---|---|---|---|---|---|----|----|----|
| A | X | X | X | X | X | O | X | X | X | X | X | X |
| B | X | X | X | O | O | X | X | X | X | X | X | X |
| C | X | X | O | O | O | X | X | X | X | X | X | X |
| D | X | X | X | O | X | O | X | X | X | X | X | X |
| E | X | X | X | X | X | X | X | X | X | X | X | X |
| F | X | X | X | X | X | X | X | X | X | X | X | X |

|   | 1 | 2 | 3 | 4 | 5 | 6 | 7 | 8 | 9 | 10 | 11 | 12 |
|---|---|---|---|---|---|---|---|---|---|----|----|----|
| A | X | O | X | X | X | X | X | X | X | X | X | X |
| B | X | X | O | X | X | X | X | O | X | O | X | X |
| C | O | X | X | X | X | O | O | X | X | X | O | O |
| D | X | X | X | X | X | O | O | X | O | X | X | X |
| E | X | O | O | X | O | O | X | O | X | X | O | O |
| F | O | X | X | O | X | X | X | O | X | X | X | X |

SYSTEM AND METHOD FOR ALLOCATING SEATS FOR A TICKETED EVENT

BACKGROUND OF THE INVENTION

1. Field of the Invention

The present invention relates generally to systems and techniques for selecting seats for a ticketed event, such as sporting events (e.g., baseball, basketball, football, hockey, auto racing), a concert, movie or theatrical performance, television talk shows, award shows, speeches, religious ceremonies, graduations or an airplane, boat, train or bus trip. More particularly, the present invention relates to a system and method for allocating seats for a ticketed event.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

A variety of different ticket reservation systems have been used to reserve and/or sell tickets for events, such as sporting events (e.g., baseball, basketball, football, hockey, auto racing), concerts, movie or theatrical performance, television talk shows, award shows, speeches, religious ceremonies, graduations or an airplane, boat, train or bus trip or any other event. Some reservation systems allow the purchaser to select the exact seat at the event. Other reservation systems select the purchased seats in the next available seats for a particular seating area or seating category, such as balcony seats, floor seats, or in the case of a baseball game, for example, seats behind home plate. Some events may have designated sections of seats which form different areas or categories of pricing for tickets. However, existing reservation systems can result in fragmented seating as reserved seats may surround a small number of unsold seats. Such isolated seats may be difficult to sell or reserve. This process potentially reduces the total number of seats that may be sold for the event. Further, the isolated seats may be close to other unsold seats and several such open seats could be sold to a group wanting to sit near each other. Current ticket reservation systems cannot identify such arrangements and potentially do not maximize ticket sales as a result.

In some situations, ticketed events are attended by larger groups of people wanting to sit near each other. However, due to the fragmentation of reserved seats, it can be difficult to identify groupings of multiple seats that are available for reservation. As such, larger groups of people either must purchase tickets for seats in less desirable, and thus more available seating areas or, alternatively, the groups must break up into smaller groups of people, or alternatively, not purchase tickets.

U.S. Patent Application No. 2004/0181438 entitled "System and Method for Dynamic Seat Allocation" describes a system and method for dynamic seat allocation. The system dynamically allocates seat assignments using a matrix having a plurality of available seats, a first seating arrangement using fewer than the entire plurality of available seats, the first seating arrangement based on a first seating request, a subsequent seating request, and logic for revising the first seating arrangement to develop a proposed seating arrangement to accommodate the first seating request and the second seating request. Nevertheless, this system and method may cause confusion because seat assignments are changing up until the event or a short time before the event begins, and potentially will not maximize ticket sales as a result.

U.S. Patent Application No. 2003/0069764 entitled "Selling Best Available Seats at a Public Facility" describes a virtual ticket control system that controls admission of customers to a public facility. The virtual ticket control system includes 1) a plurality of terminal devices disposed at entry points to the public facility, a first one of the terminal devices for establishing a communication link to a virtual ticket device used by a customer and receiving a virtual ticket transmitted by the virtual ticket device; and 2) a virtual ticket authentication controller for receiving the received virtual ticket from the first terminal device and determining if a unique identifier associated with the received virtual ticket matches one of a plurality of stored unique identifiers associated with a plurality of authorized virtual ticket records stored in a memory associated with the virtual ticket authentication controller. This system includes an option to purchase the best seat in the facility that remains unsold and available when the customer arrives at the event. However, this system also potentially will not maximize ticket sales because the customer does not know where his/her or seat will be until entering the event. Further, there is nothing that accounts for multiple seats for groups where the seats are proximate to each other but not necessarily in the same row.

There is a need to have improved systems for determining the best group of seats available at a ticketed event. Further, there is a need to identify ticketing opportunities where ticketed seats are contiguous but not necessarily in the same row. Even further, there is a need to expedite the ticket purchasing process to quickly assure customers buying groups of tickets that seats are located near each other and informing them of the location of their seats.

SUMMARY OF THE INVENTION

One exemplary embodiment relates to a method of allocating seats to a ticketed event. The method can include receiving a request for a number of seats at a ticketed event, selecting a first seat wherein the first seat is determined to be a best unassigned seat at the ticketed event, and determining a best grouping of seats wherein the best grouping of seats includes the number of seats requested and further wherein the best grouping of seats comprises the best unassigned seat at the ticketed event.

Another exemplary embodiment relates to a system that identifies groupings of available seats to be allocated for a ticketed event. The system can include a communication interface and a programmed processor. The communication interface receives a request for a number of seats at a ticketed event. The programmed processor determines a best grouping of seats wherein the best grouping of seats includes the number of seats requested and further wherein the best grouping of seats comprises a best unassigned seat at the ticketed event.

Another exemplary embodiment relates to a system that allocates seats for a ticketed event. The system includes means for receiving a request for a number of seats at a ticketed event and means for determining a best grouping of seats wherein the best grouping of seats includes the number of seats requested and further wherein the best grouping of seats comprises a best unassigned seat at the ticketed event.

DETAILED DESCRIPTION OF EXEMPLARY EMBODIMENTS

Figure 1:
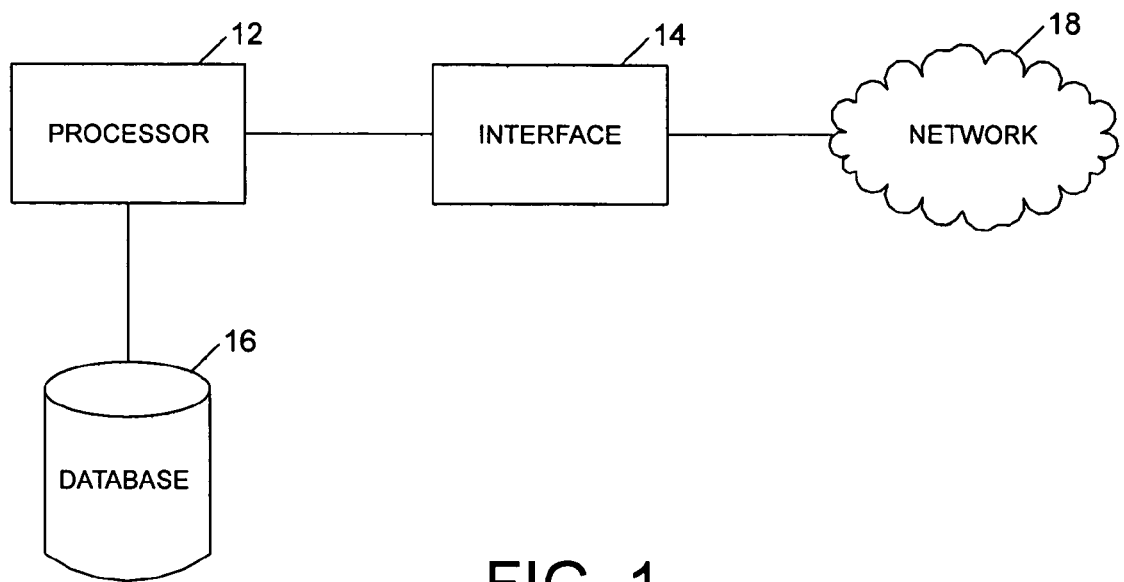
FIG. 1 is a general diagram depicting a system enabling a ticket purchaser to obtain tickets for groupings of seats to a ticketed event via a network in accordance with an exemplary embodiment.

FIG. 1 illustrates a system including a processor 12 coupled to an interface 14 and a database 16. The processor 12, interface 14, and database 16 can be part of a computer server system. The interface 14 is coupled to a network 18. The network 18 can be the Internet or any other network. The database 16 preferably contains seating charts for a plurality of venues where ticketed events occur, such as sporting events, musical concerts, entertainment presentations, religious gatherings, and other events where attendees to the event are assigned to selected seats in the venue. The interface 14 can be computer software, hardware, or a combination of software and hardware.

In at least one embodiment, a person desiring to purchase tickets to a ticketed event selects an event using a computer by means of an Internet web site or using a telephone service. The Internet web site, telephone service, or other input system is coupled to the network 18 for communication of information relating to the selection of tickets. For example, the ticket purchaser uses the network 18 to communicate the number of tickets he or she desires to purchase. The ticketing service presents the ticket purchaser with an option of a grouping of seats based on the number of tickets indicated by the purchaser and a best grouping selection made by the processor 12. If the purchaser selects the proposed grouping of seats, the ticketing transaction process proceeds. If the purchaser does not select the proposed grouping of seats, another grouping of seats can be identified and presented or the purchaser can end the ticketing session without purchasing tickets.

A wide range of implementations may be used to present the seating information. For example, a graphical representation of the seats at a ticketed event can be presented with some indication of available and unavailable seats, such as different coloring or shading or a textual indication such as an "X" in the representations of seats that are not available. Alternatively, the seating information can be presented by seat section and number. For example, available seats may be communicated as seats A4, B4, and B5 in section 104 of an arena. Other presentation techniques can also be used.

Figure 2:
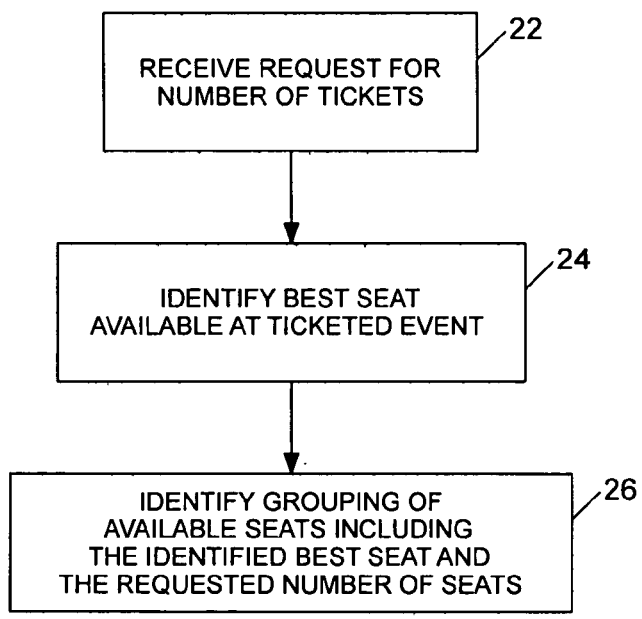
FIG. 2 is a flow diagram depicting operations performed in a process of allocating seats for a ticketed event in accordance with an exemplary embodiment.

FIG. 2 illustrates a flow diagram depicting operations in a process of allocating seats for a ticketed event. Additional, fewer, or different operations may be performed depending on the embodiment. In an operation 22, a ticket servicing computer receives a request for a number of tickets to a specified ticketed event. By way of example, the ticket servicing computer can be a server computer coupled to a network of computers, such as the Internet. In an operation 24, the ticket servicing computer identifies a best seat available at a ticketed event. Generally, the best seat available is the seat that is closest to the stage, playing field, or court. Best seat definitions can be changed based on the ticketed event. Some events may have different locations for the best seats. The best seat for a movie performance may not be the best seat for a rock concert. Further, the best seat definition can be set or adjusted by the ticket purchaser. Different purchasers may have different opinions as to the location of the best seats at the ticketed event. Some purchasers may prefer balcony seats over floor seats. Similarly, some baseball fans may prefer seats along the first or third base lines instead of behind home plate.

In an operation 26, the ticket servicing computer identifies a grouping of available seats at the ticketed event where the grouping includes the identified best seat and the requested number of seats. In an exemplary embodiment, a grouping of seats is considered a number of seats where each seat shares a common boundary with at least one other seat in the group, meaning the seats are next to each other in the same row (to the left or right), next to each other in adjacent rows (behind or in front), or diagonally next to each other in different rows but adjacent rows. If there is not a grouping of seats with the identified best seat and the requested number of seats, the ticket servicing computer identifies a next best seat and a grouping of seats including this next best seat. Such processing continues until a grouping of seats including the number of seats requested is found.

Figure 3:
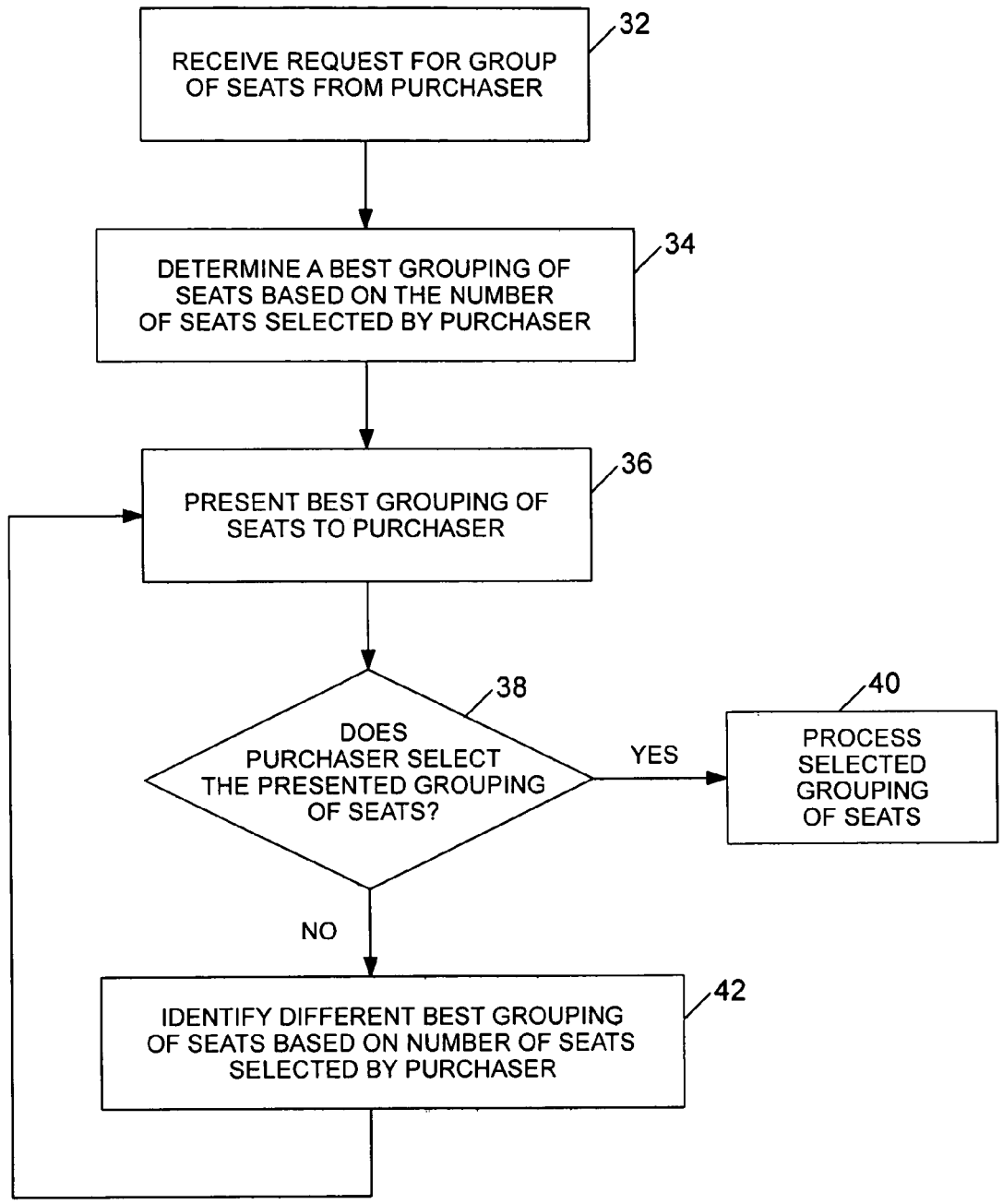
FIG. 3 is a flow diagram depicting operations performed in a process of presenting groups of available seats for a ticketed event in accordance with an exemplary embodiment.

By way of further illustration, FIG. 3 depicts a flow diagram of operations performed in a process of presenting groups of available seats for a ticketed event. Additional, fewer, or different operations may be performed depending on the embodiment. In an operation 32, a request for a group of seats is received from a purchaser. This request can be communicated in many different ways. For example, the request can be input into an Internet web site. The request can also be entered into a computer system by a ticket agent or box office employee. In an operation 34, a best grouping of seats based on the number of seats selected by the purchaser is determined. Seats are grouped based on availability and proximity. That is, only seats that are still available for purchase can be grouped and seats are only grouped if they are near each other. In an exemplary embodiment, proximity is determined by determining if seats share a boundary or are in any way contiguous. A seat shares a boundary with another seat, or is contiguous, if the seat is immediately adjacent (left, right, back, or front) or adjacent diagonally (back left, back right, front left, front right). The best seat definition can be set by the ticket purchaser or the ticker seller. Different ticket purchasers may consider different types of seats better than others. Further, the type of seats considered "best" by the purchaser may change depending on the event. For example, best seats for one ticket purchaser may be third base line seats for one baseball game and seats behind home plate for another baseball game.

In an operation 36, the determined best grouping of seats is presented to the purchaser. This presentation can be done graphically using a graphical user interface in the case of an Internet application. The presentation can also be done using textual symbols communicated to a computer, cell phone, personal digital assistant (PDA), or other device. Alternatively, the presentation can be done by automated process over the telephone or by a live operator or ticket agent. Other presentation techniques may also be used.

In an operation 38, the purchaser communicates whether he or she selects the presented grouping of seats for purchase for the ticketed event. If the purchaser indicates that the grouping of seats will be purchased, an operation 40 is performed in which the selected grouping of seats are marked as unavailable and a purchase transaction is processed. If the purchaser indicates that the grouping of seats will not be purchased, an operation 42 is performed in which a different grouping of best seats is identified based on the number of seats selected by the purchaser. The process of finding a grouping of seats continues until the purchaser makes a purchase, the purchaser ends the session, or all grouping options have been presented for the ticketed event. In alternative embodiments, more than one groupings of seats can be presented to the purchaser at once from which the purchaser can select the grouping he or she wants.

Figure 4:
FIG. 4 is a diagram of a section of seats for a ticketed event with a certain number of seats being available for reservation or purchase for the ticketed event in accordance with an exemplary embodiment.

FIG. 4 illustrates a section 46 of seats for a ticketed event with a certain number of seats being available for reservation or purchase for the ticketed event. For illustration purposes, unavailable seats are depicted with an "X" and available seats are depicted with an "O". In section 46, seats A6, B4, B5, C3, C4, C5, D4, and D6 are part of the same grouping of seats because each one shares at least one common boundary with another seat in the grouping. Seats A6 and B5, for example, share a diagonal boundary. As such, these seats are available for a grouping of eight ticketed persons.

Figure 5:
FIG. 5 is a diagram of a section of seats for a ticketed event with a certain number of seats being available for reservation or purchase for the ticketed event in accordance with yet another exemplary embodiment.

FIG. 5 illustrates a section 54 of seats for a ticketed event with a certain number of seats being available for reservation or purchase for the ticketed event. As with FIG. 4, for illustration purposes, unavailable seats are depicted with an "X" and available seats are depicted with an "O". In section 54, seat C1 is available but does not share a boundary with another available seat and, therefore, cannot be included in a grouping of more than one seat. In contrast, seats E2 and E3 share boundaries with seats F1 and F4, respectively. Seat F4 shares a boundary with seat E5. Accordingly, a grouping of thirteen seats is available—seats F1, E2, E3, F4, E5, E6, D6, D7, C6, C7, B8, E8, and F8. This grouping of thirteen seats can be presented to a purchasers desiring to purchase thirteen tickets as a group or the grouping can be divided into subgroups for purchaser seeking groups of six and seven tickets or other various combinations.

While several embodiments of the invention have been described, it is to be understood that modifications and changes will occur to those skilled in the art to which the invention pertains. For example, a computer system has been described that identifies seats that are adjoining or sharing a common boundary. The computer system can also identify seats meeting other selection criteria to form a grouping of seats that may not be adjoining or sharing a common boundary (e.g., same section of a stadium, same priced tickets). Accordingly, the claims appended to this specification are intended to define the invention precisely.

What is claimed is:

1. A method for allocating ticketed event seats, the method comprising:
   receiving, at a device, a request for a number of seats at a ticketed event;
   the device selecting a first seat wherein the first seat is determined to be a best unassigned seat at the ticketed event; and
   the device determining a best grouping of seats wherein the best grouping of seats includes the number of seats requested and further wherein the best grouping of seats comprises the best unassigned seat at the ticketed event.

2. The method of claim 1, wherein determining a best grouping of seats comprises identifying unassigned seats at the ticketed events that are adjoining each other and total the number of seats requested.

3. The method of claim 2, wherein adjoining seats in a group are seats sharing a boundary with at least one other seat in the group.

4. The method of claim 1, wherein determining a best grouping of seats comprises identifying unassigned seats at the ticketed events that are adjoining each other, are located in more than one row, and total the number of seats requested.

5. The method of claim 1, further comprising presenting the determined best grouping of seats.

6. The method of claim 5, further comprising receiving a communication to reserve the determined best grouping of seats.

7. The method of claim 5, further comprising receiving a communication to identify a next best grouping of seats, wherein a next best grouping of seats includes the number of seats requested and further wherein the next best grouping of seats comprises the next best unassigned seat at the ticketed event.

8. The method of claim 5, further comprising receiving a definition of best seat from a ticket purchaser.

9. A system that identifies groupings of available seats to be allocated for a ticketed event, the system comprising:
   a communication interface that receives a request for a number of seats at a ticketed event; and
   a programmed processor that determines a best unassigned seat at the ticketed event and a best grouping of seats wherein the best grouping of seats includes the number of seats requested and further wherein the best grouping of seats comprises the best unassigned seat at the ticketed event.

10. The system of claim 9, wherein the best grouping of seats comprises seats in a group where the seats in the group share a boundary with at least one other seat in the group.

11. The system of claim 9, further comprising a database containing seating information for the ticketed event.

12. The system of claim 9, wherein the processor determines a next best grouping of seats if the best seat unassigned at the ticketed event does not have a grouping of proximate seats totaling the number of seats requested.

13. The system of claim 9, wherein the programmed processor determines more than one grouping of seats wherein each of the more than one grouping of seats includes the number of seats requested.

14. The system of claim 13, wherein the communication interface receives a selection of the more than one grouping of seats.

15. The system of claim 9, wherein the communication interface is coupled to the Internet.

16. The system of claim 9, wherein the best unassigned seat is selected from a section of seats identified by a ticket purchaser.

17. A system that allocates seats for a ticketed event, the system comprising:
   means for receiving a request for a number of seats at a ticketed event;
   means for determining a best unassigned seat at the ticketed event; and
   means for determining a best grouping of seats wherein the best grouping of seats includes the number of seats requested and further wherein the best grouping of seats comprises the best unassigned seat at the ticketed event.

18. The system of claim 17, wherein the best grouping of seats comprises seats in a group where the seats in the group share a boundary with at least one other seat in the group.

19. The system of claim 17, further comprising means for determining more than one grouping of seats wherein each of the more than one grouping of seats includes the number of seats requested.

20. The system of claim 17, further comprising means for identifying sub-grouping of seats wherein the sub-grouping of seats includes the number of seats requested and further wherein the sub-grouping of seats comprises a best unassigned seat at the ticketed event.

21. The system of claim 20, wherein the sub-grouping of seats comprises two sub-groups.

22. The system of claim 17, wherein criteria for seats in a group is adjustable by selection from a ticket purchaser.

* * * * *

(12) EX PARTE REEXAMINATION CERTIFICATE (9931st)

United States Patent
Bowman et al.

(10) Number: US 8,121,872 C1
(45) Certificate Issued: Nov. 8, 2013

(54) SYSTEM AND METHOD FOR ALLOCATING SEATS FOR A TICKETED EVENT

(75) Inventors: Robert A. Bowman, Westport, CT (US); Heather L. Benz, Kinnelon, NJ (US); Mark Plutzer, Great Neck, NY (US)

(73) Assignee: MLB Advanced Media, L.P., New York, NY (US)

Reexamination Request:
No. 90/012,432, Aug. 14, 2012

Reexamination Certificate for:
Patent No.: 8,121,872
Issued: Feb. 21, 2012
Appl. No.: 10/998,834
Filed: Nov. 29, 2004

(51) Int. Cl.
*G06Q 10/00* (2012.01)
(52) U.S. Cl.
USPC .............................................. 705/5

(58) Field of Classification Search
None
See application file for complete search history.

(56) References Cited

To view the complete listing of prior art documents cited during the proceeding for Reexamination Control Number 90/012,432, please refer to the USPTO's public Patent Application Information Retrieval (PAIR) system under the Display References tab.

*Primary Examiner* — Cameron Saadat

(57) ABSTRACT

A system and method relates to allocating seats to a ticketed event. The method can include receiving a request for a number of seats at a ticketed event, selecting a first seat wherein the first seat is determined to be a best unassigned seat at the ticketed event, and determining a best grouping of seats wherein the best grouping of seats includes the number of seats requested and further wherein the best grouping of seats comprises the best unassigned seat at the ticketed event.

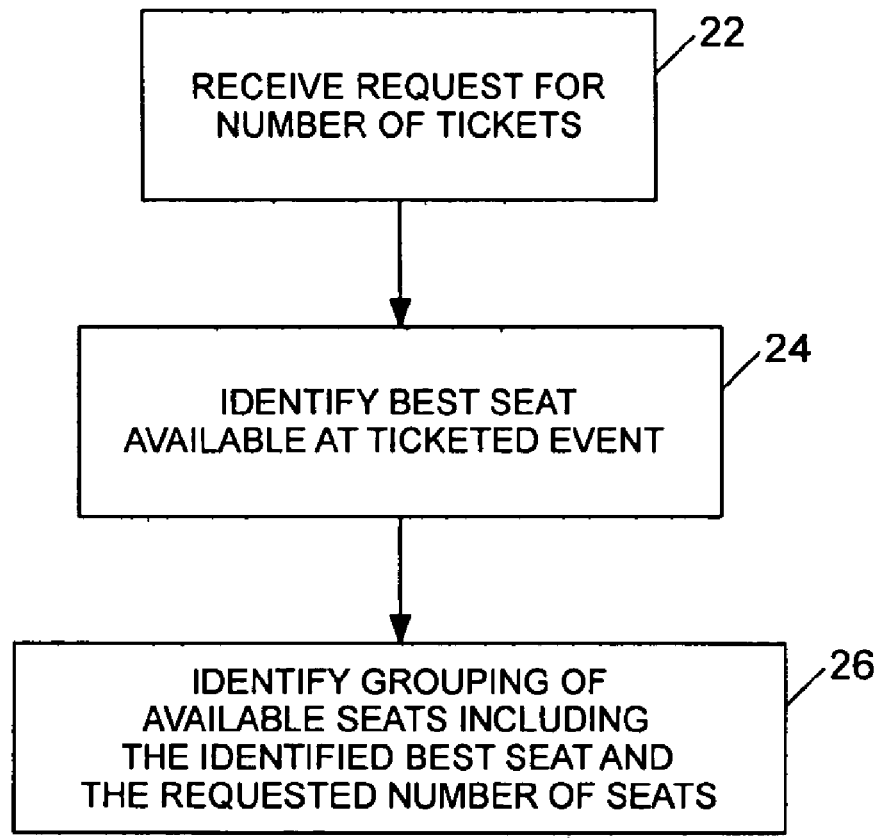

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 5, 11, 16 and 19 are cancelled.

Claims 1, 3-4, 6-10, 17-18 and 20 are determined to be patentable as amended.

Claims 12-15 and 21-22, dependent on an amended claim, are determined to be patentable.

1. A method for allocating ticketed event seats *with a device having a processor coupled to an interface and a database*, the method comprising:

*the device presenting a purchaser with an option of grouping of seats based on a number of tickets indicated by the purchaser and a best grouping selection made by the processor;* receiving, at [a] *the* device, a request for a number of seats at a ticketed event;

the device selecting a first seat wherein the first seat is determined to be a best unassigned seat at the ticketed event; [and]

the device determining a best grouping of seats wherein the best grouping of seats includes the number of seats requested and further wherein the best grouping of seats comprises the best unassigned seat at the ticketed event; *and*

*the device presenting said best grouping of seats to the purchaser for selection by the purchaser,*

*wherein the first seat is determined to be a best unassigned seat at the ticketed event according to a definition based on the ticketed event, wherein the definition is set by a ticket seller.*

3. The method of claim [2] *1*, wherein [adjoining seats in a group are seats sharing] *each seat in the best grouping of seats share* a boundary with at least one other seat in the group *so that the grouping of seats is contiguous*.

4. The method of claim 1, wherein [determining a best grouping of seats comprises identifying] unassigned seats [at the ticketed events] *in the best grouping of seats include seats that* [are adjoining each other,] are located in more than one row[, and total the number of seats requested].

6. The method of claim [5] *1*, further comprising receiving a communication to reserve the determined best grouping of seats.

7. The method of claim [5] *1*, further comprising receiving a communication to identify a next best grouping of seats, wherein a next best grouping of seats includes the number of seats requested and further wherein the next best grouping of seats comprises the next best unassigned seat at the ticketed event.

8. The method of claim [5] *1*, further comprising receiving a definition of best seat from a ticket purchaser.

9. A system that identifies groupings of available seats to be allocated for a ticketed event, the system comprising:

a database containing seating information for the ticketed event;

a communication interface that receives a request for a number of seats at a ticketed event; and a [programmed] processor [that determines] *programmed to:*

*present a purchaser with an option of grouping of seats based on a number of tickets indicated by the purchaser and a best grouping selection made by the processor;*

*select a first seat wherein the first seat is determined to be* a best unassigned seat at the ticketed event [and]*;*

*determine* a best grouping of seats wherein the best grouping of seats includes the number of seats requested and further wherein the best grouping of seats comprises the best unassigned seat at the ticketed event; *and*

*present said best grouping of seats to the purchaser for selection by the purchaser,*

*wherein the first seat is determined to be a best unassigned seat at the ticketed event according to a definition based on the ticketed event, wherein the definition is set by a ticket seller.*

10. The system of claim 9, wherein *each seat in* the best grouping of seats [comprises seats in a group where the seats in the group] share a boundary with at least one other seat in the [group] *grouping so that the grouping of seats is contiguous*.

17. A system that allocates seats for a ticketed event, the system comprising:

means *for presenting a purchaser with an option of grouping of seats based on a number of tickets indicated by the purchaser and a best grouping selection made by the processor;* means for receiving a request for a number of seats at a ticketed event;

means for determining a best unassigned seat at the ticketed event, *said best unassigned seat being determined by the device according to a definition based on the ticketed event*; [and]

means for determining a best grouping of seats wherein the best grouping of seats includes the number of seats requested and further wherein the best grouping of seats comprises the best unassigned seat at the ticketed event; *and*

*means for presenting said best grouping of seats to the purchaser for selection by the purchaser,*

*wherein the definition is set by a ticket seller.*

18. The system of claim 17, wherein *each seat in* the best grouping of seats [comprises seats in a group where the seats in the group] share a boundary with at least one other seat in the [group] *grouping, so that the grouping of seats is contiguous*.

20. The system of claim 17, further comprising means for [identifying sub-grouping of seats wherein the sub-grouping of seats includes the number of seats requested and further wherein the sub-grouping of seats comprises a best unassigned seat at the ticketed event] *dividing said best grouping of seats into sub-groups*.

* * * * *